US 12,405,903 B2

(12) United States Patent
Hewson et al.

(10) Patent No.: US 12,405,903 B2
(45) Date of Patent: *Sep. 2, 2025

(54) SYSTEM AND METHOD FOR FACILITATING FINE-GRAIN FLOW CONTROL IN A NETWORK INTERFACE CONTROLLER (NIC)

(71) Applicant: Hewlett Packard Enterprise Development LP, Spring, TX (US)

(72) Inventors: David Charles Hewson, Bristol (GB); Abdulla M. Bataineh, Seattle, WA (US); Thomas L. Court, Three Lakes, WI (US); Duncan Roweth, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/542,412

(22) Filed: Dec. 15, 2023

(65) Prior Publication Data

US 2024/0121179 A1  Apr. 11, 2024

Related U.S. Application Data

(63) Continuation of application No. 17/594,818, filed as application No. PCT/US2020/024245 on Mar. 23, 2020, now Pat. No. 11,863,431.

(Continued)

(51) Int. Cl.
*G06F 13/16* (2006.01)
*G06F 9/50* (2006.01)
(Continued)

(52) U.S. Cl.
CPC .......... *G06F 13/1642* (2013.01); *G06F 9/505* (2013.01); *G06F 9/546* (2013.01);
(Continued)

(58) Field of Classification Search
CPC ....... H04L 47/11; H04L 47/12; H04L 47/122; H04L 47/18; H04L 47/20; H04L 47/22;
(Continued)

(56) References Cited

U.S. PATENT DOCUMENTS 6,026,075 A      2/2000  Linville et al.
7,720,951 B2 *   5/2010  Brown .................... H04L 47/26
                                                           370/235
(Continued)

FOREIGN PATENT DOCUMENTS

CN       1633786 A     6/2005
CN     101572672 A    11/2009
(Continued)

*Primary Examiner* — Mohamed A Kamara
(74) *Attorney, Agent, or Firm* — Yao Legal Services, Inc.

(57) ABSTRACT

A network interface controller (NIC) capable of facilitating fine-grain flow control (FGFC) is provided. The NIC can be equipped with a network interface, an FGFC logic block, and a traffic management logic block. During operation, the network interface can determine that a control frame from a switch is associated with FGFC. The network interface can then identify a data flow indicated in the control frame for applying the FGFC. The FGFC logic block can insert information from the control frame into an entry of a data structure stored in the NIC. The traffic management logic block can identify the entry in the data structure based on one or more fields of a packet belonging to the flow. Subsequently, the traffic management logic block can determine whether the packet is allowed to be forwarded based on the information in the entry.

20 Claims, 10 Drawing Sheets

Related U.S. Application Data

(60) Provisional application No. 62/852,203, filed on May 23, 2019, provisional application No. 62/852,289, filed on May 23, 2019, provisional application No. 62/852,273, filed on May 23, 2019.

(51) Int. Cl.
| | |
|---|---|
| *G06F 9/54* | (2006.01) |
| *G06F 12/0862* | (2016.01) |
| *G06F 12/1036* | (2016.01) |
| *G06F 12/1045* | (2016.01) |
| *G06F 13/14* | (2006.01) |
| *G06F 13/28* | (2006.01) |
| *G06F 13/38* | (2006.01) |
| *G06F 13/40* | (2006.01) |
| *G06F 13/42* | (2006.01) |
| *G06F 15/173* | (2006.01) |
| *H04L 1/00* | (2006.01) |
| *H04L 43/0876* | (2022.01) |
| *H04L 43/10* | (2022.01) |
| *H04L 45/00* | (2022.01) |
| *H04L 45/02* | (2022.01) |
| *H04L 45/021* | (2022.01) |
| *H04L 45/028* | (2022.01) |
| *H04L 45/12* | (2022.01) |
| *H04L 45/122* | (2022.01) |
| *H04L 45/125* | (2022.01) |
| *H04L 45/16* | (2022.01) |
| *H04L 45/24* | (2022.01) |
| *H04L 45/42* | (2022.01) |
| *H04L 45/745* | (2022.01) |
| *H04L 47/10* | (2022.01) |
| *H04L 47/11* | (2022.01) |
| *H04L 47/12* | (2022.01) |
| *H04L 47/122* | (2022.01) |
| *H04L 47/20* | (2022.01) |
| *H04L 47/22* | (2022.01) |
| *H04L 47/24* | (2022.01) |
| *H04L 47/2441* | (2022.01) |
| *H04L 47/2466* | (2022.01) |
| *H04L 47/2483* | (2022.01) |
| *H04L 47/30* | (2022.01) |
| *H04L 47/32* | (2022.01) |
| *H04L 47/34* | (2022.01) |
| *H04L 47/52* | (2022.01) |
| *H04L 47/62* | (2022.01) |
| *H04L 47/625* | (2022.01) |
| *H04L 47/6275* | (2022.01) |
| *H04L 47/629* | (2022.01) |
| *H04L 47/76* | (2022.01) |
| *H04L 47/762* | (2022.01) |
| *H04L 47/78* | (2022.01) |
| *H04L 47/80* | (2022.01) |
| *H04L 49/00* | (2022.01) |
| *H04L 49/101* | (2022.01) |
| *H04L 49/15* | (2022.01) |
| *H04L 49/90* | (2022.01) |
| *H04L 49/9005* | (2022.01) |
| *H04L 49/9047* | (2022.01) |
| *H04L 67/1097* | (2022.01) |
| *H04L 69/22* | (2022.01) |
| *H04L 69/40* | (2022.01) |
| *H04L 45/28* | (2022.01) |
| *H04L 45/7453* | (2022.01) |
| *H04L 69/28* | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1673* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(58) Field of Classification Search
CPC ..... H04L 47/24; H04L 47/26; H04L 47/2441; H04L 47/2466; H04L 47/2483; H04L 47/30; H04L 47/323; H04L 47/34; H04L 47/39; H04L 47/52; H04L 47/621; H04L 47/6235; H04L 47/626; H04L 47/6275; H04L 47/629; H04L 47/76; H04L 47/762; H04L 47/781; H04L 47/80; H04L 49/101; H04L 49/15; H04L 49/30; H04L 49/3009; H04L 49/3018; H04L 49/3027; H04L 49/90; H04L 49/9005; H04L 49/9036; H04L 49/9047

See application file for complete search history.

(56) References Cited

U.S. PATENT DOCUMENTS

| | | |
|---|---|---|
| 2003/0123393 A1 | 7/2003 | Feuerstraeter et al. |
| 2004/0019895 A1 | 1/2004 | Dubal |

(56) References Cited

U.S. PATENT DOCUMENTS

| | | | |
|---|---|---|---|
| 2006/0056308 A1* | 3/2006 | Gusat | H04L 45/00 370/254 |
| 2014/0286351 A1 | 9/2014 | Turgeman et al. | |
| 2014/0348007 A1 | 11/2014 | Beecroft | |

FOREIGN PATENT DOCUMENTS

| | | |
|---|---|---|
| CN | 105191235 A | 12/2015 |
| JP | 2017-112517 A | 6/2017 |

* cited by examiner

SYSTEM AND METHOD FOR FACILITATING FINE-GRAIN FLOW CONTROL IN A NETWORK INTERFACE CONTROLLER (NIC)

CROSS REFERENCE TO RELATED APPLICATIONS

This application is a continuation of U.S. patent application Ser. No. 17/594,818, filed on Oct. 29, 2021, which application is a national stage of International Application No. PCT/US2020/024245, filed on Mar. 23, 2020, which claims the benefit of U.S. Provisional Application No. 62/852,203 filed on May 23, 2019, U.S. Provisional Application No. 62/852,273 filed on May 23, 2019 and U.S. Provisional Application No. 62/852,289 filed May 23, 2019. The disclosures of the aforementioned applications are hereby incorporated by reference in their entireties.

BACKGROUND

Field

This is generally related to the technical field of networking. More specifically, this disclosure is related to systems and methods for facilitating a network interface controller (NIC) with fine-grain flow control (FGFC) support.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of facilitating fine-grain flow control (FGFC) is provided. The NIC can be equipped with a network interface, an FGFC logic block, and a traffic management logic block. During operation, the network interface can determine that a control frame from a switch is associated with FGFC. The network interface can then identify a data flow indicated in the control frame for applying the FGFC. The FGFC logic block can insert information from the control frame into an entry of a data structure stored in the NIC. The traffic management logic block can identify the entry in the data structure based on one or more fields of a packet belonging to the flow. Subsequently, the traffic management logic block can determine whether the packet is allowed to be forwarded based on the information in the entry.

BRIEF DESCRIPTION OF THE FIGURES

In the figures, like reference numerals refer to the same figure elements.

DETAILED DESCRIPTION

Figure 1:
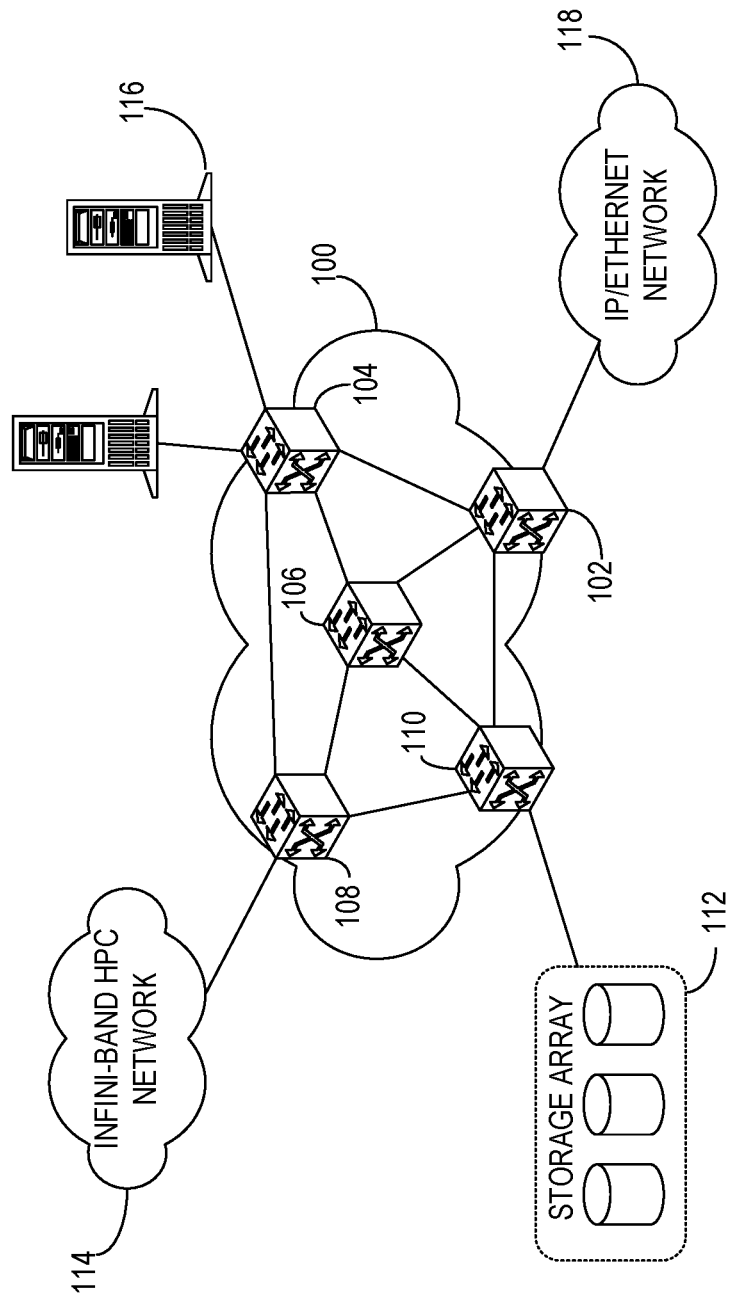
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate fine-grain flow control (FGFC) in a network interface controller (NIC). The NIC allows a host to communicate with a data-driven network. The network can accommodate dynamic data traffic with fast, effective congestion control by maintaining state information of individual packet streams. More specifically, packets injected into the network of switches can be categorized into streams, which can be mapped to their layer-2, layer-3, or other protocol-specific header information. Each stream can be marked by a distinctive identifier that is local to an input port of a switch, and provided with a stream-specific input buffer so that each stream can be individually flow-controlled. In addition, packets of a respective stream can be acknowledged upon reaching the egress point of the network, and the acknowledgment packets can be sent back to the ingress point of the stream along the same data path in the reverse direction. As a result, each switch can obtain state information of active packet streams it is forwarding and can perform highly responsive, stream-specific flow control. Such flow control can allow the network to operate at higher capacity while providing versatile traffic-engineering capabilities.

The embodiments described herein solve the problem of flow-level congestion management by (i) identifying a congestion-causing flow in the NIC, and (ii) throttling the forwarding rate for packets belonging to the flow at the NIC.

Network congestion in a network, such as a switch fabric, may exhaust packet buffers of the switches in the network. With existing technologies, a switch facing congestion can instruct an upstream switch to pause or slow the packet injection rate for a specific class of traffic. However, this class-level congestion control approach may impact all data flows of the class. For example, traffic from a number of applications can belong to the same class of traffic. Consequently, packets that are not causing the congestion can be adversely affected by such a congestion control policy.

To solve this problem, the congested switch can convey flow-specific congestion notifications to a link partner, which can be a NIC on a host device. The congestion notification can generate a "back pressure" on a sequence of packets that belongs to the congestion-causing flow (e.g., an Internet Protocol (IP) level flow or an application-level flow) instead of throttling traffic from all applications and services of a traffic class. By identifying flow-level congestion, the switch can allow the NIC to facilitate fine-grain flow control (FGFC).

In some embodiments, upon detecting congestion, a switch can identify a sequence of packets that have caused that congestion. Such a sequence of packets can be referred to as a flow. The switch can then provide this information to the link partner, such as a NIC, by sending a "turn off" control frame, which can be referred to as an XOFF frame. Upon receiving the XOFF frame, the NIC can refrain from sending packets for that flow and buffer the packets in the NIC. The NIC then relies on the switch to manage the flow. Based on the congestion associated with the flow, the switch may send control frames, which can be referred to as credit frames, to the NIC.

Upon receiving the credit frames, the NIC can forward more packets belonging to the flow to the switch based on the respective amount indicated by the credit frames. This allows the NIC to limit the number of packets for the flow while facilitating regular forwarding for other flows. If the congestion is mitigated, the switch can send a "turn on" control frame, which can be referred to as an XON frame. Upon receiving the XON frame, the NIC releases the flow from FGFC and initiates regular forwarding for the packets belonging to the flow.

One embodiment of the present invention provides a NIC. The NIC can be equipped with a network interface, an FGFC logic block, and a traffic management logic block. During operation, the network interface can determine that a control frame from a switch is associated with FGFC. The network interface can then identify a data flow indicated in the control frame for applying the FGFC. The FGFC logic block can insert information from the control frame into an entry of a data structure stored in the NIC. The traffic management logic block can identify the entry in the data structure based on one or more fields of a packet belonging to the flow. Subsequently, the traffic management logic block can determine whether the packet is allowed to be forwarded based on the information in the entry.

In a variation on this embodiment, the network interface can determine whether to process the control frame at the network interface based on a type of the control frame.

In a further variation, the network interface can provide information from one or more fields of the control frame to the traffic management logic block based on the type of the control frame.

In a variation on this embodiment, the network interface can generate an event for the flow based on a duration value and a credit value from the information in the control frame. The event can be an internal control message that can indicate whether to initiate or terminate the FGFC for the flow.

In a variation on this embodiment, the FGFC logic block can insert the information into the entry by: (i) determining a duration value for applying the FGFC to the flow based on the information in the control frame, and (ii) updating a duration counter in the entry based on the duration value.

In a variation on this embodiment, the FGFC logic block can insert the information into the entry by: (i) determining credit information, which indicates an amount of data of the flow that can be forwarded, from the information in the control frame, and (ii) updating a duration counter in the entry based on the duration value.

In a further variation, the traffic management logic block can allocate the packet to a message chopping unit (MCU) of a plurality of MCUs. The traffic management logic block can then arbitrate among the plurality of MCUs to select an MCU for forwarding the packet based on the credit value in the entry.

In a variation on this embodiment, the FGFC logic block can insert the information into the entry by: (i) determining whether one or more fields match an existing entry in the data structure, (ii) determining a new entry in the data structure if no match is found, and (iii) inserting information from the one or more fields into the new entry.

In a further variation, the FGFC logic block can determine whether the data structure has availability for a new entry. If the data structure does not have availability, the FGFC logic block can discard the control frame.

In a variation on this embodiment, the entry can include one or more of: an identifier, which can be the index of the entry, of the flow, a validity flag indicating whether the entry is valid, a duration counter indicating a duration value for applying FGFC to the flow, a credit value indicating an amount of data of the flow that can be forwarded, and an event queue identifier.

In a variation on this embodiment, the FGFC logic block can be associated with the network interface or the traffic management logic block.

Figure 2A:
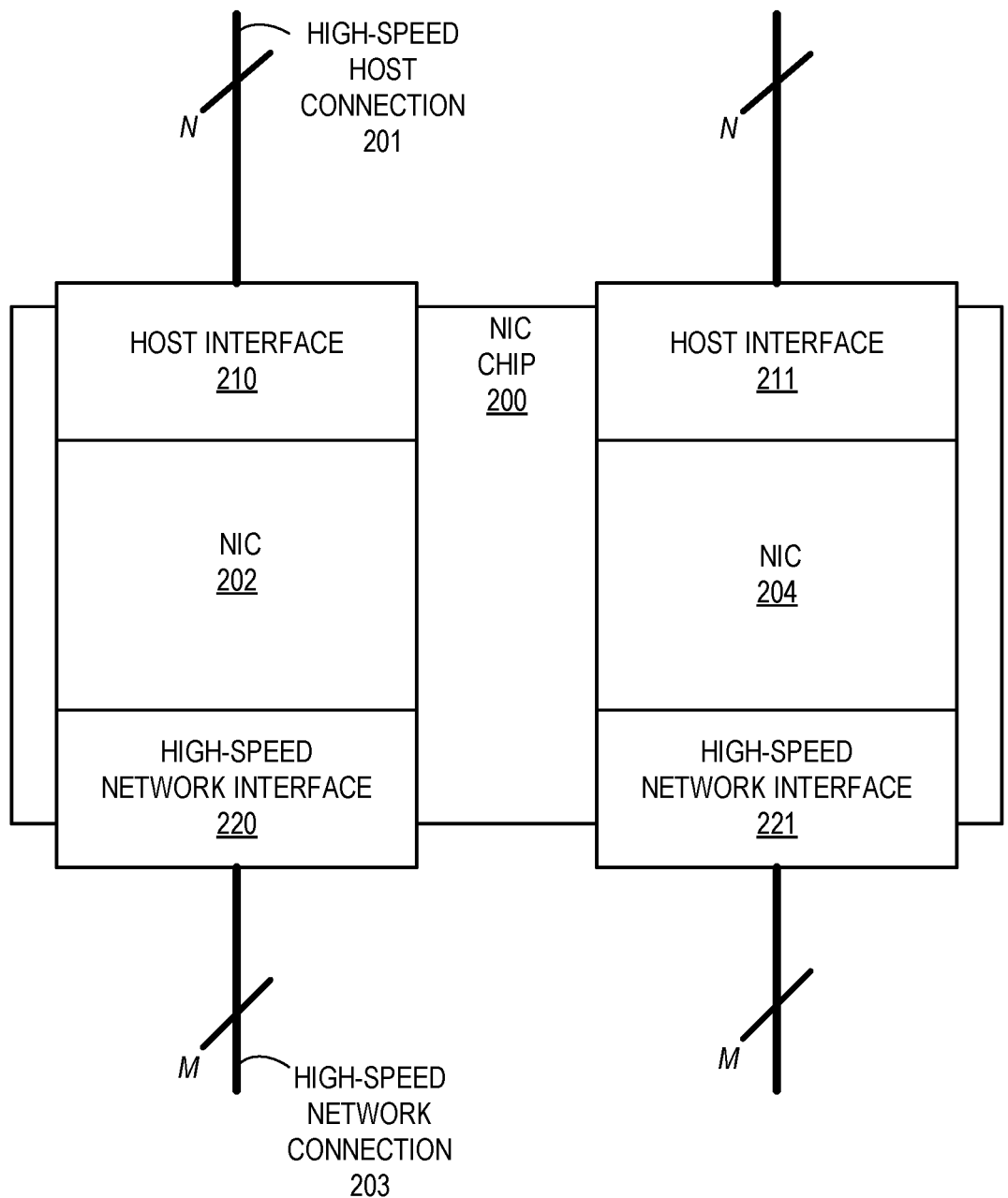
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports FGFC.

In this disclosure, packet streams can also be referred to as "packet flows," or simply "flows." The data path traversed by a flow, together with its configuration information maintained by switches, can be referred to as a "flow channel." Furthermore, the terms "buffer" and "queue" are used interchangeably in this disclosure.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
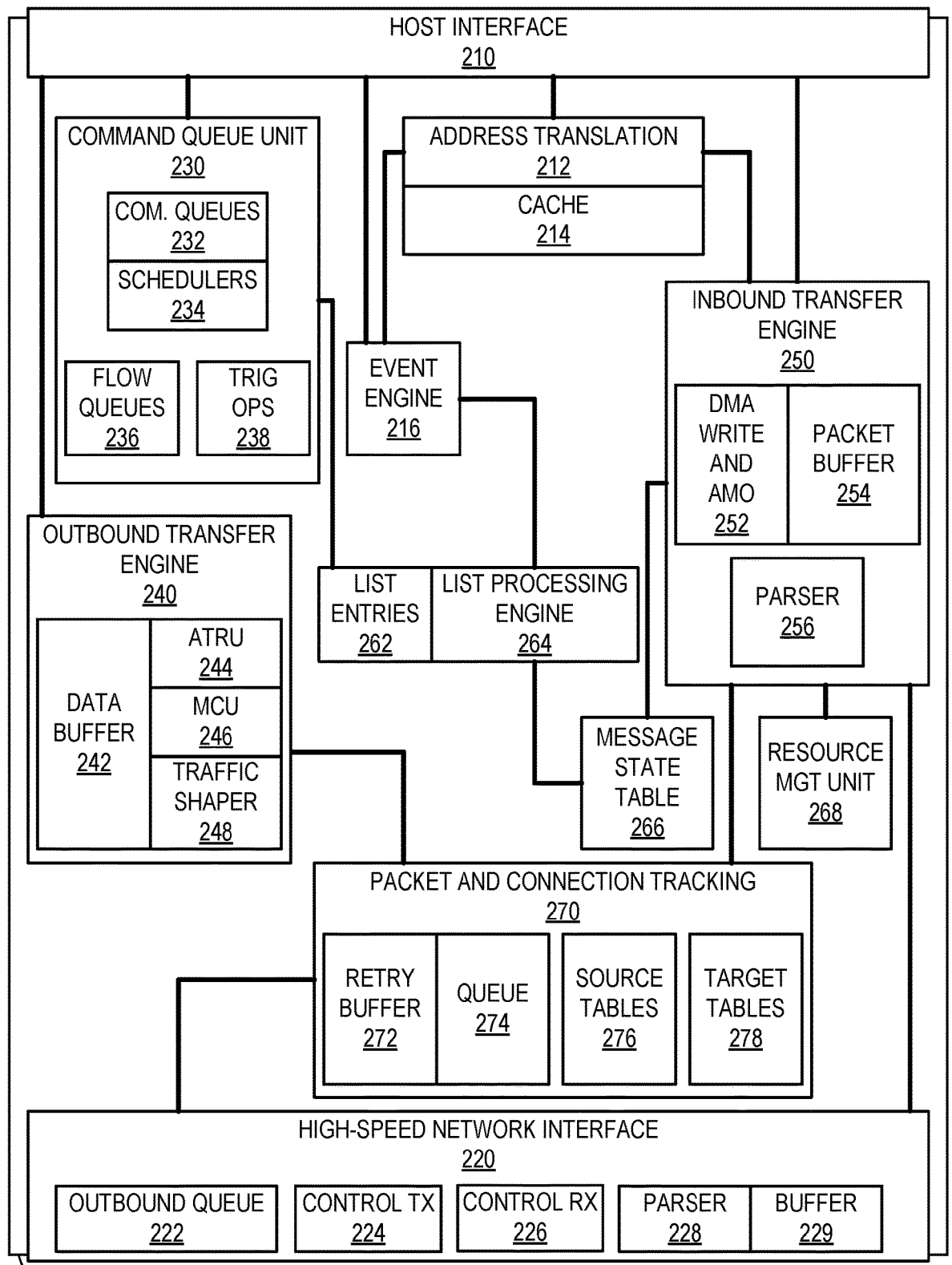
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Congestion Management in NIC

Figure 2C:
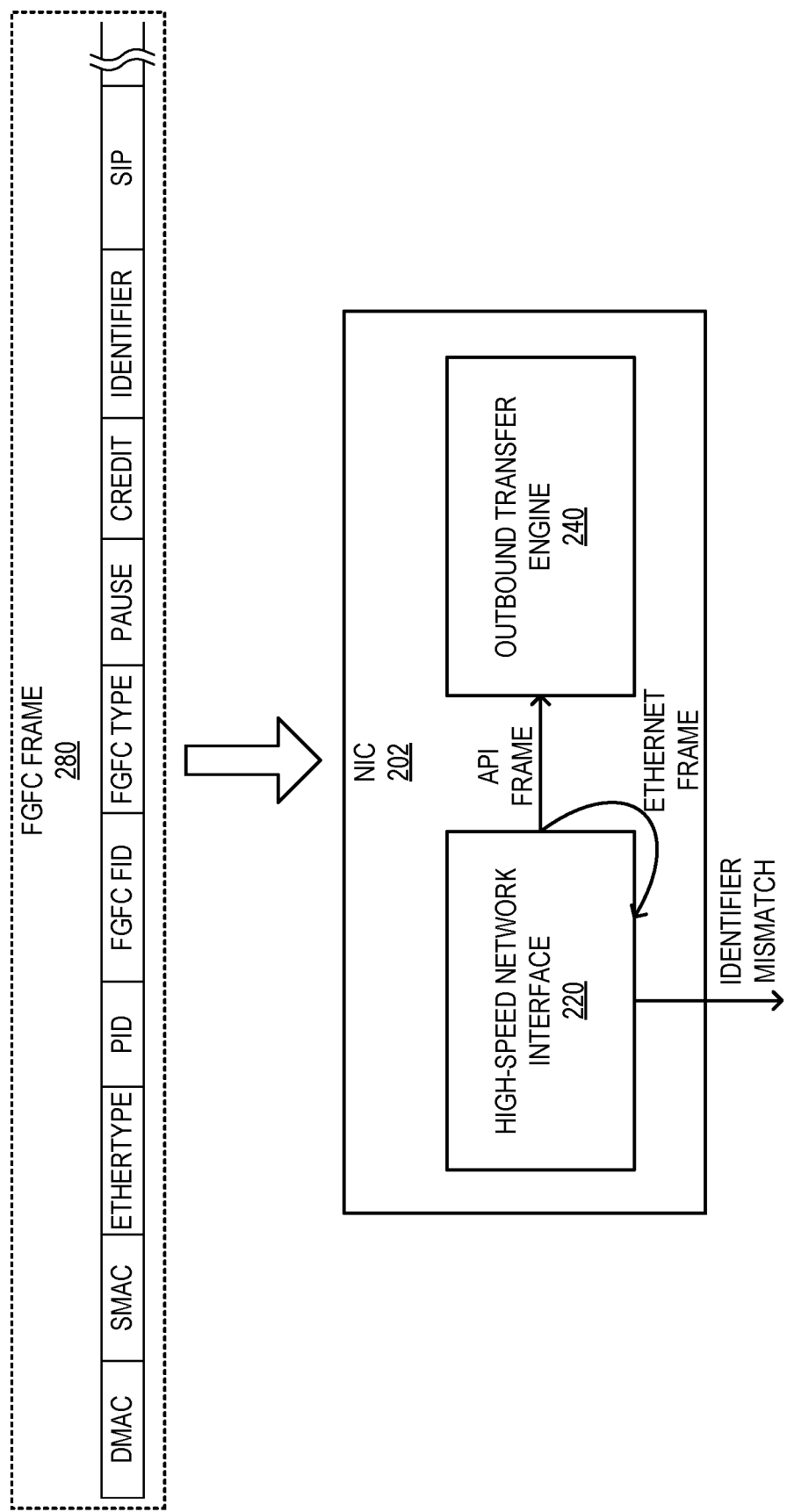
FIG. 2C shows an exemplary FGFC selection process in a NIC.

FIG. 2C shows an exemplary FGFC selection process in a NIC. NIC 202 can use the control frames to control the flow of packets at a fine-level. During operation, upon receiving an FGFC control frame 280, NIC 202 can determine a type of frame based on one or more header fields of frame 280. Frame 280 can be an Ethernet frame with a number of header fields, such as a destination MAC (DMAC) address, a source MAC (SMAC), address, an organizationally unique identifier (OUI) extended Ethertype, a protocol identifier (PID), an FGFC frame identifier (FID), an FGFC type, a pause period value (e.g., expressed as Ethernet pause quanta), an FGFC credit value, an FGFC identifier, an IPv4 source IP (SIP) address, and an IPv6 SIP address.

The FGFC identifier can include one or more of: a virtual network identifier (VNI), a VLAN ID, IPv4 flow label, and IPv6 flow label. The FGFC FID can include a predetermined value associated with a respective FGFC frame. The PID can be expressed based on an OUI, which can indicate that the link partners are from supported vendors and may support the same protocol. Instead of specifying a traffic class for flow control, NIC 202 can identify a flow based on the VNI, which can be based on a source IP address and a hash over a number of fields of a packet, such as a protocol type, source and destination IP addresses, and source and destination ports, etc. VNIs can be added by NIC 202 if NIC 202 is a source NIC, and can be removed by NIC 202 if NIC 202 is a destination NIC. VNIs can be checked by the ingress and egress switches of a switch fabric.

NIC 202 can facilitate Ethernet-based or an API-based FGFC. For example, if the link partner of NIC 202 supports Portals API, NIC 202 can provide API-based FGFC for the link partner. On the other hand, if the link partner supports Ethernet-based communication, NIC 202 can provide Ethernet-based FGFC. Upon receiving frame 280, HNI 220 can inspect a number of fields of frame 280, such as the DMAC address, Ethertype, the PID, and the FID, to determine that frame 280 is an FGFC frame. In some embodiments, HNI 220 can maintain a set of control and status registers (CSRs) to store the expected pieces of information and match the fields with the corresponding CSR. For example, the DMAC address field should match a CSR that can store a MAC address of NIC 202.

If HNI 220 determines that frame 280 is an FGFC frame, HNI 220 inspects the FGFC type field of frame 280. The FGFC type can identify whether the FGFC frame is based on an API, such as portals API, or Ethernet, IPv4, or IPv6 protocol. HNI 220 can maintain a CSR for each of these types. If the FGFC type of frame 280 matches none of the types, HNI 220 can issue an error message and drop frame 280. If the FGFC type indicates API-based FGFC, HNI 220 can provide the pause period, FGFC credit value, and the lower portion of the identifier (e.g., the lower 16 bits) of frame 280 to OXE 240 for further processing. On the other hand, if the FGFC type indicates Ethernet, IPv4, or IPv6, HNI 220 can determine that frame 280 is an Ethernet-based FGFC frame. In some embodiments, HNI 220 can then process frame 280 in HNI 220. NIC 202 may also process frame 280 at any other element of NIC 202. For example, OXE 240 or CQ unit 230 in FIG. 2B may process an FGFC control frame. Furthermore, an MCU module may generate packets and stall a corresponding command queue.

Figure 3A:
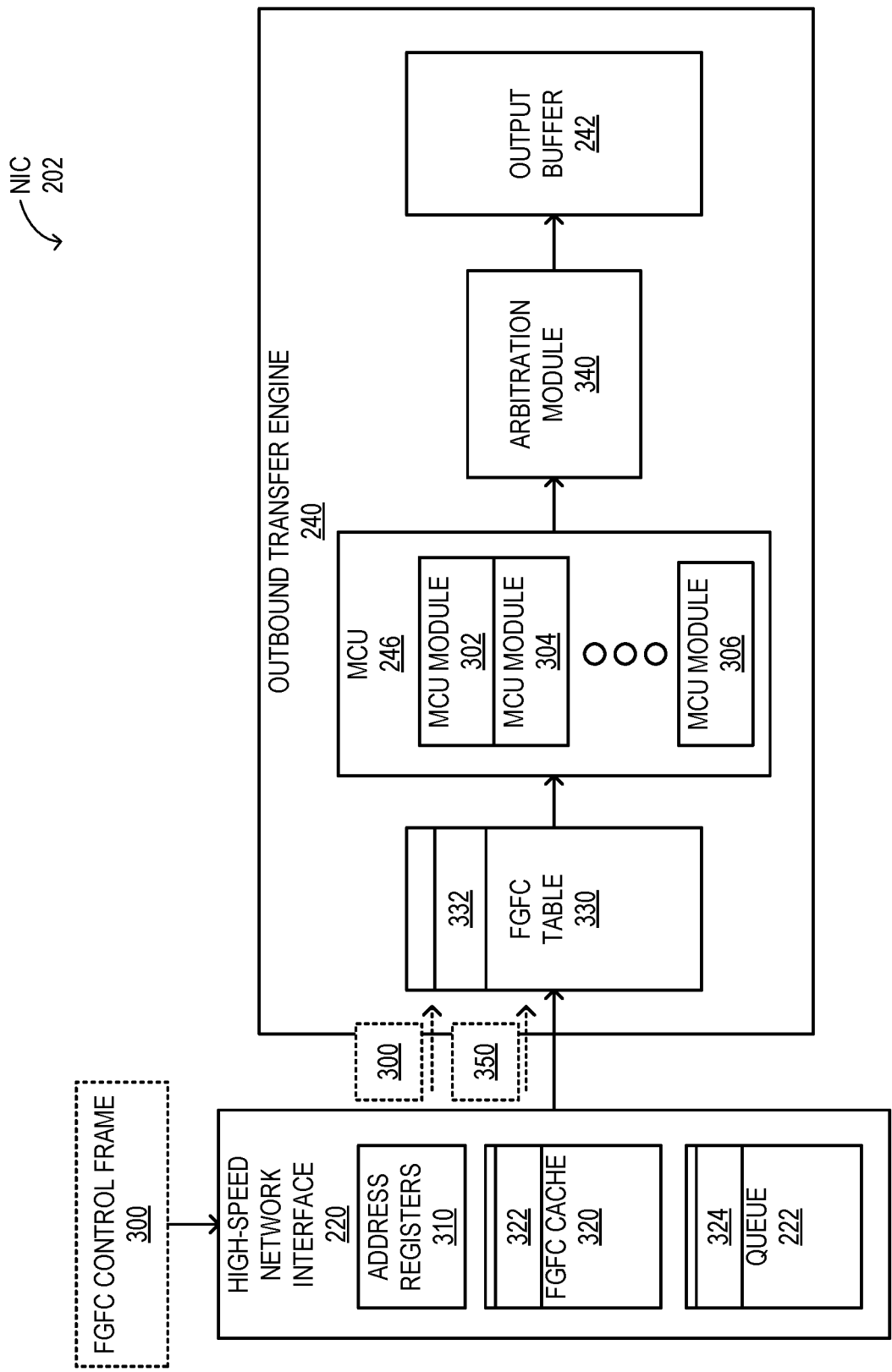
FIG. 3A shows an exemplary FGFC control process in a NIC.

FIG. 3A shows an exemplary FGFC control process in a NIC. Since HNI 220 is the interface that forms a link with the switch fabric, NIC 202 receives an FGFC control frame 300 at HNI 220. If HNI 220 determines that frame 300 is an Ethernet-based FGFC frame, HNI 220 can process frame 300 using a set of address CSRs 310, an FGFC cache 320, and output queue 222. CSRs 310 can include a set of CSRs (e.g., 4 CSRs) for each of IPv4 and IPv6 addresses of NIC 202. HNI 220 can match the IPv4 or IPv6 source address of frame 300 with the values stored in the corresponding CSRs. Each of the addresses can be associated with an event queue (EQ) identifier identifying a corresponding EQ, as described in conjunction with FIG. 2B. Furthermore, CSRs 310 can include a programmable CSR for an EQ identifier. If the fields of frame 300 do not match the values stored in the corresponding CSRs, HNI 220 can discard the frame.

FGFC cache 320 can have a plurality of entries, each of which can store information associated with a flow. For example, FGFC cache 320 can include a cache entry 322, which can include information associated with a flow, such as a valid field (e.g., a flag), a type field, a tag for the source IP address, an identifier field, an EQ identifier field, and a pause counter. The valid field can indicate whether entry 322 is valid. The type field can indicate an FGFC type for entry 322. The source IP address tag can indicate a type for a source IP address for entry 322. For example, the tag can incorporate an integer value from 0 to 3, each indicating a type of IP address. A value of 0 can indicate a layer-2 frame. The identifier field can store a 32-bit identifier from frame 300 associated with the tag. The EQ identifier field can store the EQ identifier obtained from the matched address. Furthermore, the pause counter can be decremented periodically based on the Ethernet pause standard. The pause counter can be loaded from an FGFC frame and decrement over time based on the pause quanta.

If HNI 220 can successfully match an address of frame 300 with an address stored in CSRs 310, HNI 220 can determine whether cache 320 is enabled. If cache 320 is disabled, each frame matching an address in CSRs 310 can generate an event (e.g., to be managed by EE 216 in FIG. 2B). The event can be an internal control message for communication among the elements of NIC 202. On the other hand, if cache 320 is enabled, the type, the tag for a source IP address, and an identifier in frame 300 are checked against the information in a respective entry in cache 320.

If the fields of frame 300 match a valid entry and frame 300 has a pause period of zero, HNI 220 can set that entry in cache 320 as invalid (e.g., by modifying the valid field). HNI 220 can then forward an event (e.g., to EE 216 in FIG. 2B). The event can indicate XON for the EQ identifier of the entry and include the credit value specified in frame 300. On the other hand, if the fields of frame 300 match a valid entry and frame 300 has a non-zero pause period value, HNI 220 can update the pause counter based on the pause period value in frame 300. HNI 220 can then forward an XOFF event that can include the non-zero credit value specified in frame 300. However, if the credit value is zero, HNI 220 can update cache 320 without forwarding an event.

If the fields of frame 300 do not match a valid entry, HNI 220 can determine whether frame 300 includes a non-zero pause period value and whether cache 320 has availability for a new entry (e.g., whether a cache line is available). If cache 320 has availability and frame 300 includes a non-zero pause period value, HNI 220 can generate an entry in cache 320 with the pause counter set to the pause period value in frame 320. HNI 220 can also forward an XOFF event that can include the credit value specified in frame 300. On the other hand, if cache 320 does not have availability and frame 300 includes a non-zero pause period value, HNI 220 can discard frame 300 without creating an event. If frame 300 includes a zero pause period value, HNI 220 can forward an XON event that can include the credit value specified in frame 300.

If an entry in cache 320 has a pause counter value below the pause quanta, HNI 220 can set a flag for the entry indicating that HNI 220 should create an XON event. HNI 220 can apply a round-robin arbitration process to select the entry. Subsequently, HNI 220 can invalidate the entry and forward an event. The event can indicate an XON status for the EQ identifier of the entry. However, if a subsequent FGFC frame arrives before the entry is selected via the arbitration, HNI 220 can update the pause counter in the entry and remove the request for arbitration for the entry. The EQ identifier from the entry can be used to locate the target event queue. In some embodiments, HNI 220 can perform the arbitration based on the clock of NIC 202 when there is no incoming Ethernet-based FGFC frame that matches an address and there is availability in queue 222.

Queue 222 allows HNI 220 HNI to process a small number of FGFC frames if EE 216 is backed up. Events forwarded from a prior state can be inserted into queue 222. If queue 222 is full, the generated event can be discarded. A respective entry of queue 222, such as entry 324, can include a return code, a type field, a tag for a source IP address, an identifier field, credit information, an XOFF indicator, an EQ identifier, and an event type. The return code can be set to a constant, which indicates a valid return. The type field can indicate whether frame 300 corresponds to Ethernet, IPv4, or IPv6. The tag for the source IP can indicate a type of IP address of the source address of frame 300. The respective values for the identifier and credit fields can be obtained from corresponding fields in frame 300. The XOFF indicator can indicate whether an XOFF event should be generated. The EQ identifier field can store the EQ identifier obtained from the matched address. Moreover, the event type field can be set to Ethernet. The respective values for the type, tag, identifier, and EQ identifier fields can be obtained from cache 320 if a cache timeout occurs for an XON event. Furthermore, the value of the credits field can be set to zero for the cache timeout event.

On the other hand, if the FGFC type indicates API-based FGFC, HNI 220 can provide information 350 associated with frame 300 to OXE 240 for further processing. Information 350 can include the pause period value, FGFC credit value, and the lower portion of the identifier (e.g., the lower 16 bits) of frame 300. OXE 240 can then store information 350 in an FGFC table 330. NIC 202 can throttle packets belonging to a flow subjected to FGFC using table 330. Table 330 can include a plurality of entries. A respective entry of table 330, such as entry 332, can include a VNI field, a valid field (e.g., a flag), a credit field, and a pause counter. These fields can include 16 bits, 1 bit, 24 bits, and 32 bits, respectively.

OXE 240 can match the VNI field with an incoming FGFC packet and determine, from MCU 246, an MCU module that is allowed to send more packets. The valid field can indicate whether a VNI is valid. The credit field can store the sum of credit values received in the FGFC frames, such as frame 300. In some embodiments, each credit allows an MCU module to forward one byte. If the value of the credit field becomes negative, table 330 can have a shortage of credit to send a packet. The credit field can be associated with a maximum value (i.e., a maximum value to which the credit can be incremented). The pause counter can correspond to Ethernet Pause. The upper 16 bits can be loaded from frame 300. The lower 16 bits can represent a fraction that can be decremented over time based on the pause quanta.

Upon classifying frame 300 as an API-based FGFC frame, HNI 220 can pass frame 300 to OXE 240 for processing if table 330 is enabled. If frame 300 matches a valid entry for the VNI in frame 300 and frame 300 has a pause period value of zero, OXE 240 can mark the entry as invalid. Otherwise, if frame 300 matches a valid entry for the VNI in frame 300 and frame 300 has a non-zero pause period value, OXE 240 can increment the credit value in the entry based on the credit indicated in frame 300 and update the pause counter based on the pause value of frame 300. If frame 300 does not match a valid entry and table 330 has availability (e.g., a line in table 300 is available), OXE 240 can create an entry in table 330 by inserting the VNI, the credit value, and the pause value from frame 300 into the entry. The initial credit can be subtracted by a credit adjustment constant. In some embodiments, the default value for this constant can be determined as (MTU+maximum header size+FCS). Here, FCS indicates a frame check sequence. If frame 300 does not match a valid entry and table 330 does not have availability, OXE 240 can drop frame 300.

Figure 3B:
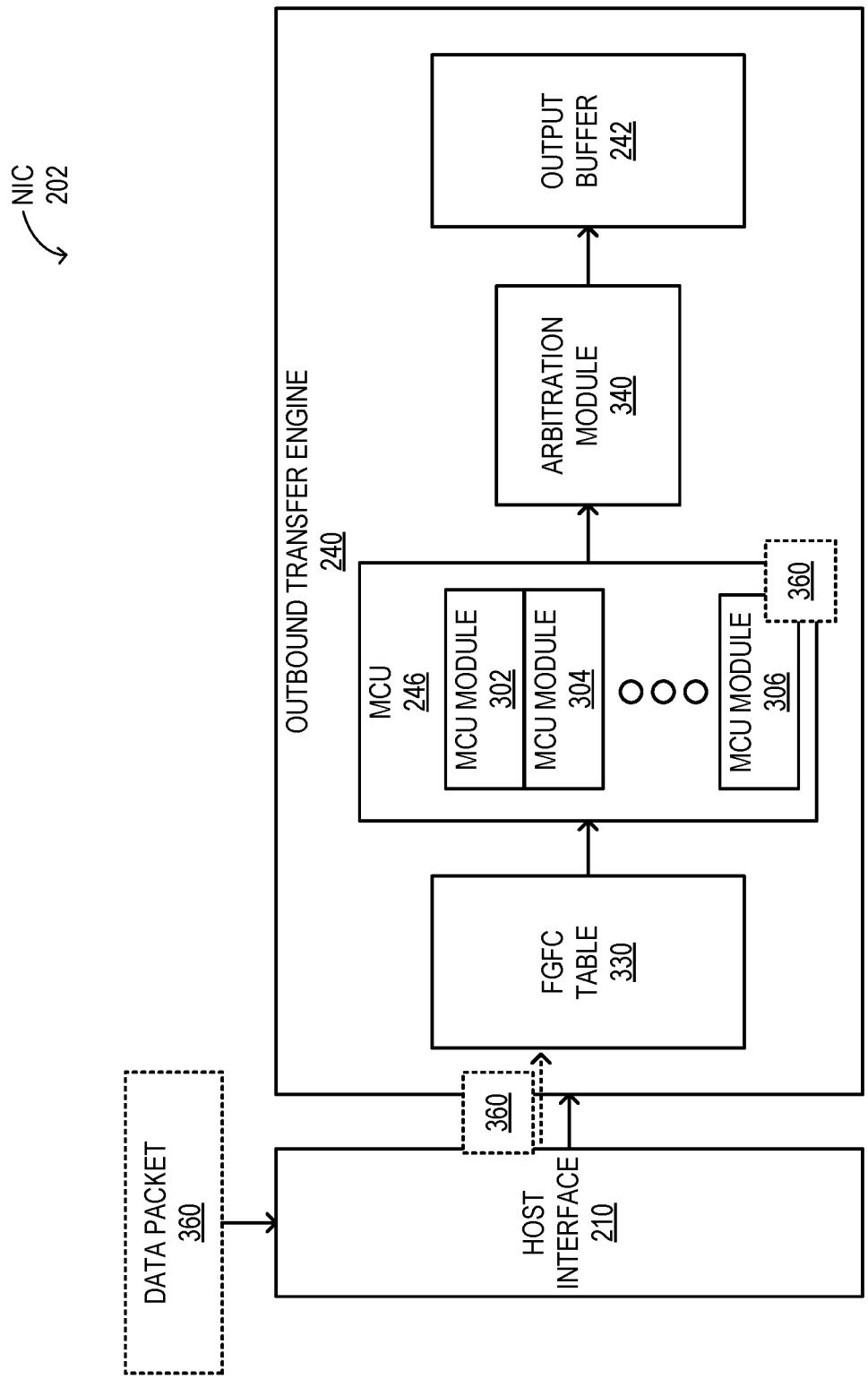
FIG. 3B shows an exemplary data packet forwarding process associated with FGFC in a NIC.

FIG. 3B shows an exemplary data packet forwarding process associated with FGFC in a NIC. During operation, the host device of NIC 202 can send a data packet 360 belonging to a flow subject to FGFC via host interface 210. Within NIC 202, packet 360 can be forwarded to OXE 240. When packet 360 arrives at OXE 240, packet 360 can be allocated to one of a number MCU modules 302, 304, and 306 in MCU 246. OXE 240 can use an arbitration module 340 to select an MCU module for forwarding a packet. In other words, the arbitration (e.g., based on a round-robin technique or a priority value) provided by arbitration module 340 can schedule packet forwarding from an MCU module. Suppose that packet 360 has been allocated to MCU module 306. If arbitration module 340 selects MCU module 306, MCU module 306 can check whether the VNI in packet 360 matches an entry in table 330.

If no entry matches packet 360, OXE 240 can allow packet 360 to proceed and can be placed in output buffer 242. If an entry exists and the credit is not negative in the entry, OXE 240 can allow packet 360 to proceed and deduct an amount of credit from the credit field of the matching entry. The amount of credit can be determined as:

$$[(\text{byte\_len}+\text{extra\_bytes}+2^{round\_pos}-1) \& \sim(2^{round\_pos}-1)].$$

However, if an entry exists and the credit is negative, OXE 240 can set an FGFC flag for MCU module 306 and discards packet 360 (e.g., by disqualifying the selection of MCU module 306 in the arbitration process).

Because MCU module 306's FGFC flag is set, arbitration module 340 can remove MCU module 306 from arbitration. OXE 240 can save the index of the corresponding entry (i.e., the entry that matched packet 360) of table 330. OXE 240 can then monitor the entry based on the index. If the entry becomes invalidated or the credit value in the entry is incremented to a non-negative value, OXE 240 can clear the FGFC flag of MCU module 306. When the FGFC flag is cleared, arbitration module 340 can include MCU module 306 in the arbitration process. Furthermore, when FGFC is applied to an MCU module, in addition to selecting the MCU module based on the credit during the arbitration process, that MCU module can be in an "in order" mode. Consequently, that MCU module may forward packets based on their order until that MCU module is subject to FGFC.

Figure 4A:
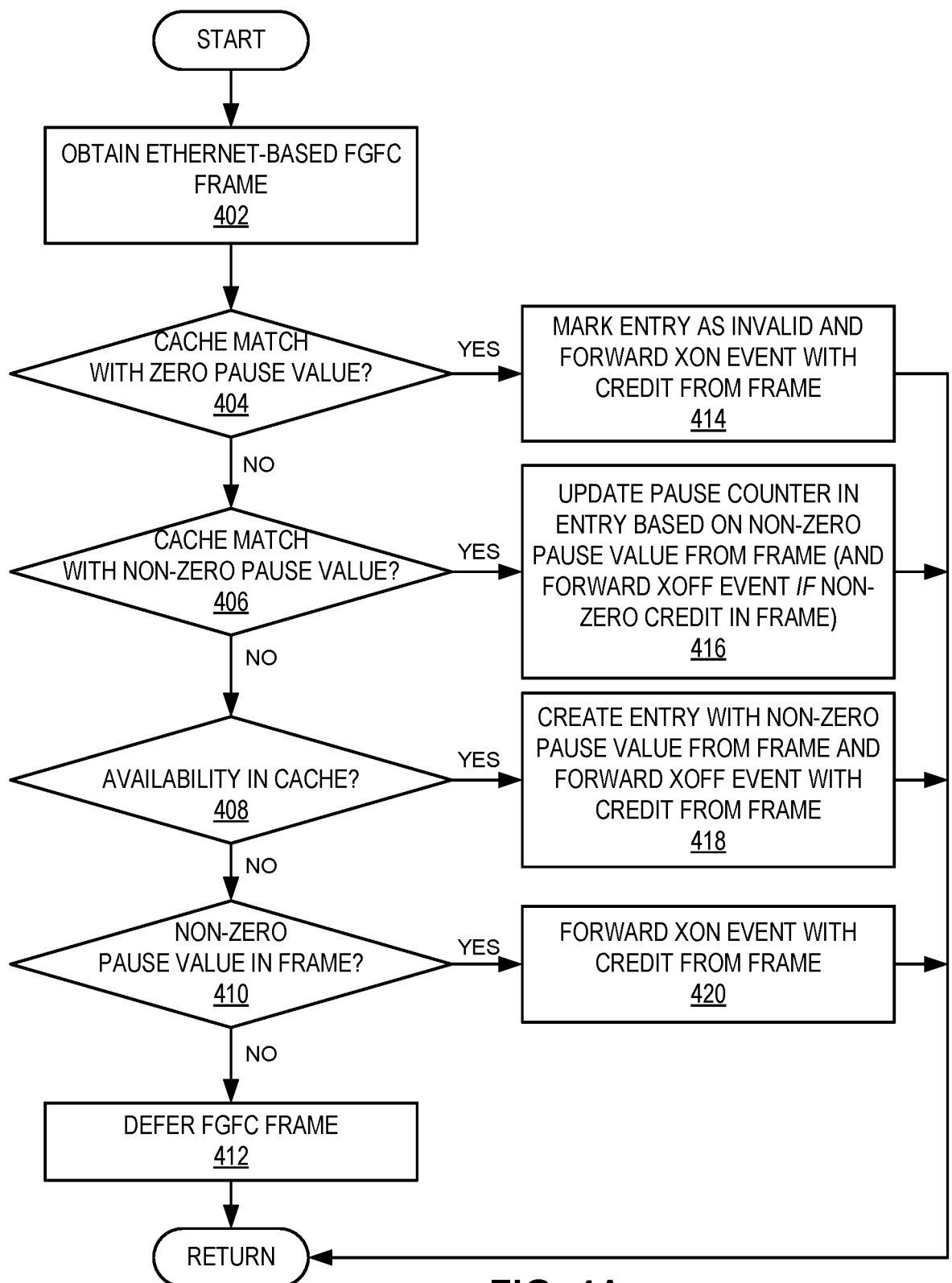
FIG. 4A shows a flow chart of an Ethernet-based FGFC process in a NIC.

FIG. 4A shows a flow chart of an Ethernet-based FGFC process in a NIC. During operation, an HNI of the NIC can obtain an Ethernet-based FGFC frame (operation 402). The HNI can then check whether the frame matches an entry in the FGFC cache and has a zero pause value (operation 404). If the frame matches an entry in the FGFC cache and has a zero pause value, the HNI can mark the entry as invalid and forward an XON event with the credit from the frame (operation 414). Otherwise, the HNI can check whether the frame matches an entry in the FGFC cache and has a non-zero pause value (operation 406). If the frame matches an entry in the FGFC cache and has a non-zero pause value, the HNI can process the frame based on the credit value. The HNI can update the pause counter in the entry based on the non-zero pause value from the frame and forward an XOFF event with the non-zero credit from the frame if the frame has a non-zero credit value in the frame (denoted with parentheses) (operation 416). On the other hand, HNI can update the pause counter in the entry based on the non-zero pause value from the frame without forwarding the XOFF event if the frame has a zero credit value in the frame (operation 416).

If the frame does not match an entry in the FGFC cache (operations 404 and 406), the HNI can check whether the cache has availability (operation 408). If the cache has availability, the HNI can create an entry with a pause counter based on the non-zero pause value from the frame and forward an XOFF event with the credit from the frame (operation 418). If the cache does not have availability, the HNI can check whether the frame has a non-zero pause value (operation 410). If the frame has a non-zero pause value, the HNI can forward an XON event with the credit from the frame (operation 420). On the other hand, if the frame does not have a non-zero pause value (i.e., has a zero pause value), the HNI can defer the frame (operation 412) (e.g., can wait for more credits to arrive).

Figure 4B:
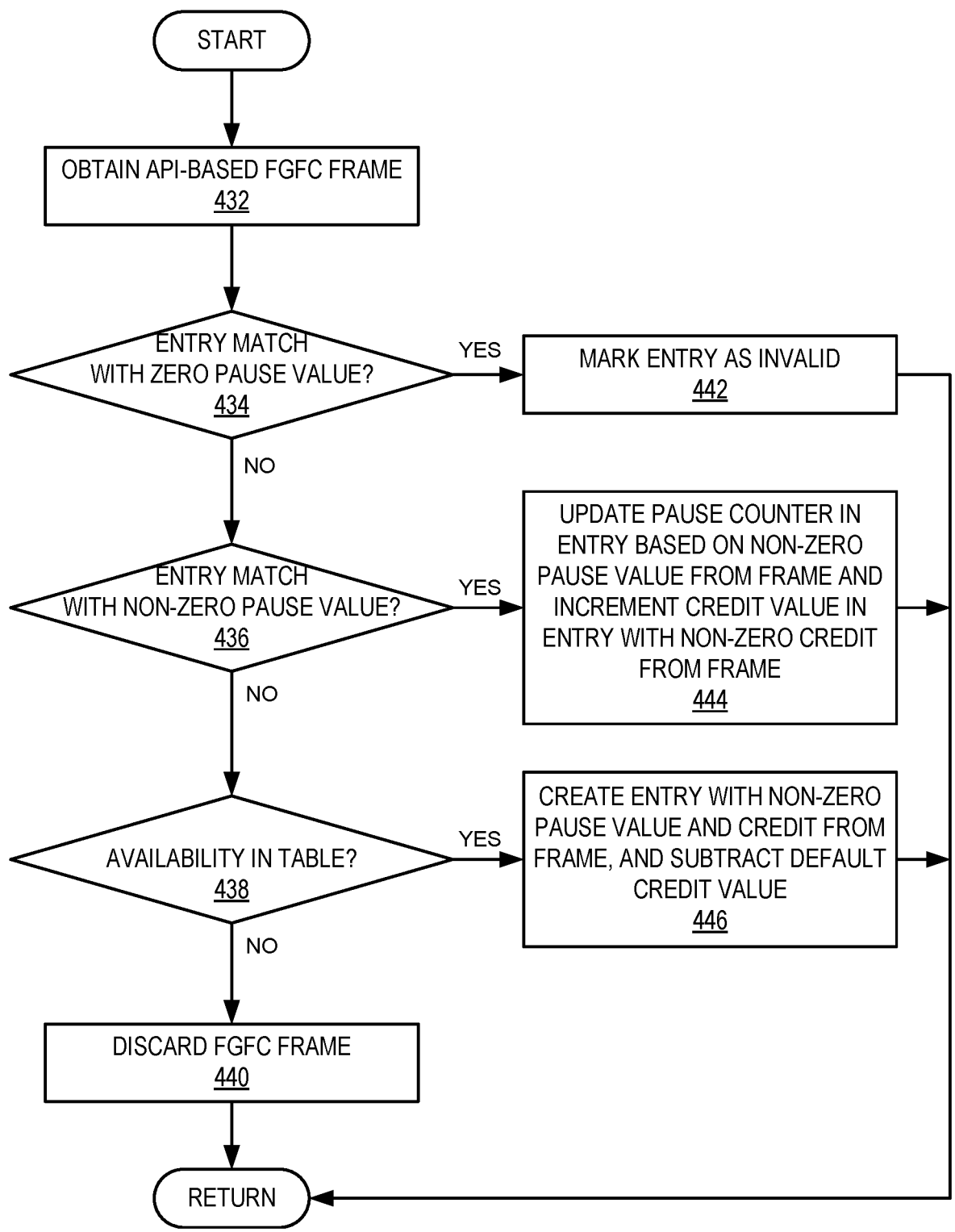
FIG. 4B shows a flow chart of an application programming interface (API) based FGFC process in a NIC.

FIG. 4B shows a flow chart of an API-based FGFC process in a NIC. During operation, an OXE of the NIC can obtain an API-based FGFC frame (operation 432). The OXE can then check whether the frame matches an entry in the FGFC table and has a zero pause value (operation 434). If the frame matches an entry in the FGFC table and has a zero pause value, the OXE can mark the entry as invalid (operation 442). Otherwise, the OXE can check whether the frame matches an entry in the FGFC table and has a non-zero pause value (operation 436). If the frame matches an entry in the FGFC table and has a non-zero pause value, the OXE can update the pause counter in the entry based on the non-zero pause value from the frame and increment the credit value in the entry with the non-zero credit from the frame (operation 444).

If the frame does not match an entry in the FGFC table (operations 434 and 436), the OXE can check whether the table has availability (operation 438). If the table has availability, the OXE can create an entry in the FGFC table with a pause counter and a credit value, and subtract a default credit value (operation 446). The pause counter can be based on the non-zero pause value and the credit value can be based on the credit from the frame. If the cache does not have availability, the OXE can discard the frame (operation 440).

Figure 4C:
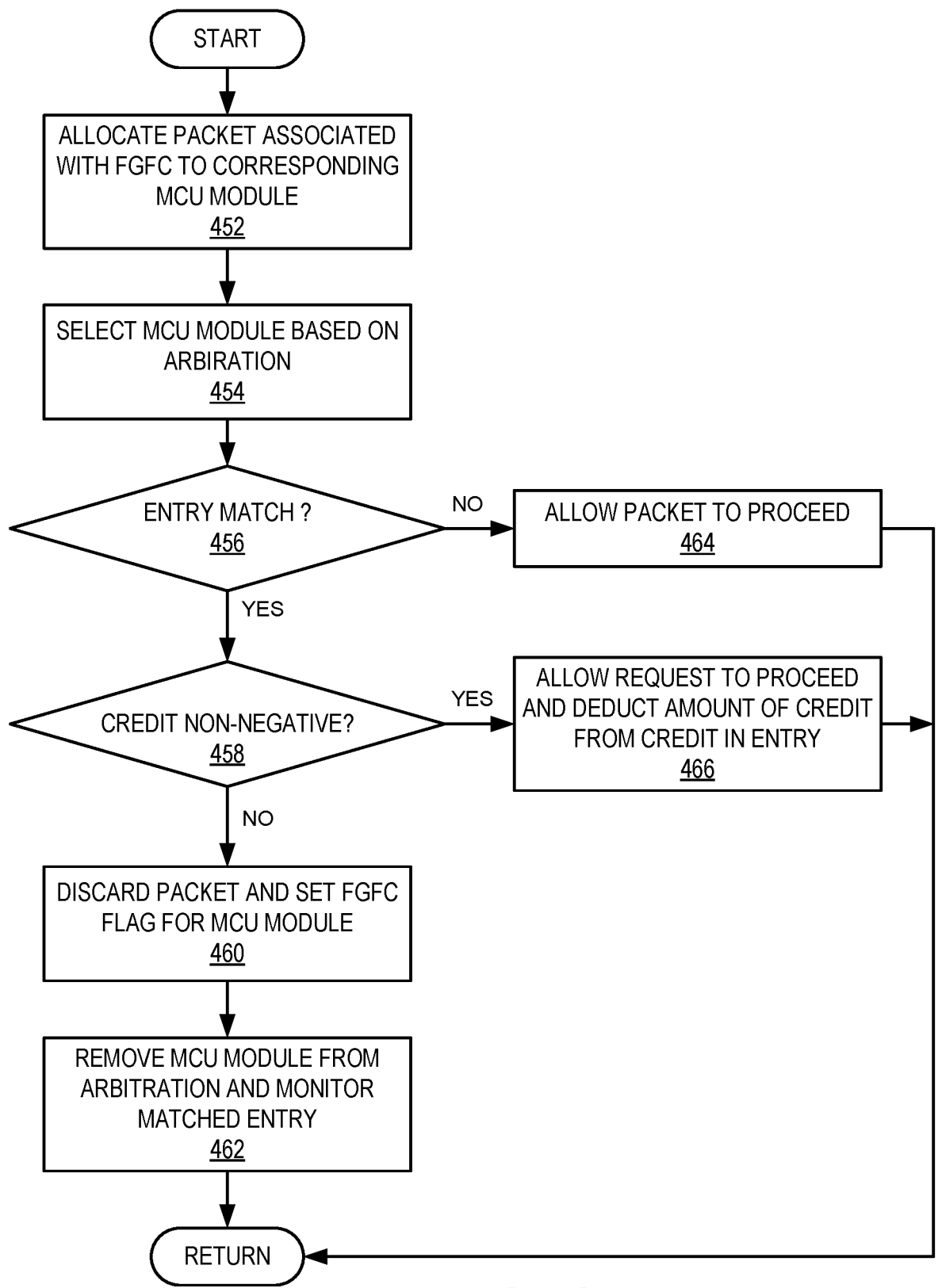
FIG. 4C shows a flow chart of an exemplary packet processing for facilitating FGFC in a NIC.

FIG. 4C shows a flow chart of an exemplary packet processing for facilitating FGFC in a NIC. During operation, an OXE of the NIC can allocate a packet associated with FGFC to a corresponding MCU module (operation 452) and select the MCU module based on arbitration (454). The OXE can then check whether the packet matches an entry in the FGFC table (operation 456). If the packet matches an entry in the FGFC table, the OXE can allow the packet to proceed (operation 464).

Otherwise, the OXE can check whether the credit is not negative in the entry (operation 458). If the credit is not negative in the entry, the OXE can allow the packet to proceed and deduct an amount of credit from the credit of the entry (operation 466). On the other hand, if the credit is negative in the entry, the OXE can discard the packet and set an FGFC flag for the MCU module (operation 460). The OXE can then remove the MCU module from arbitration and monitor the matched entry (operation 462).

Exemplary Computer System

Figure 5:
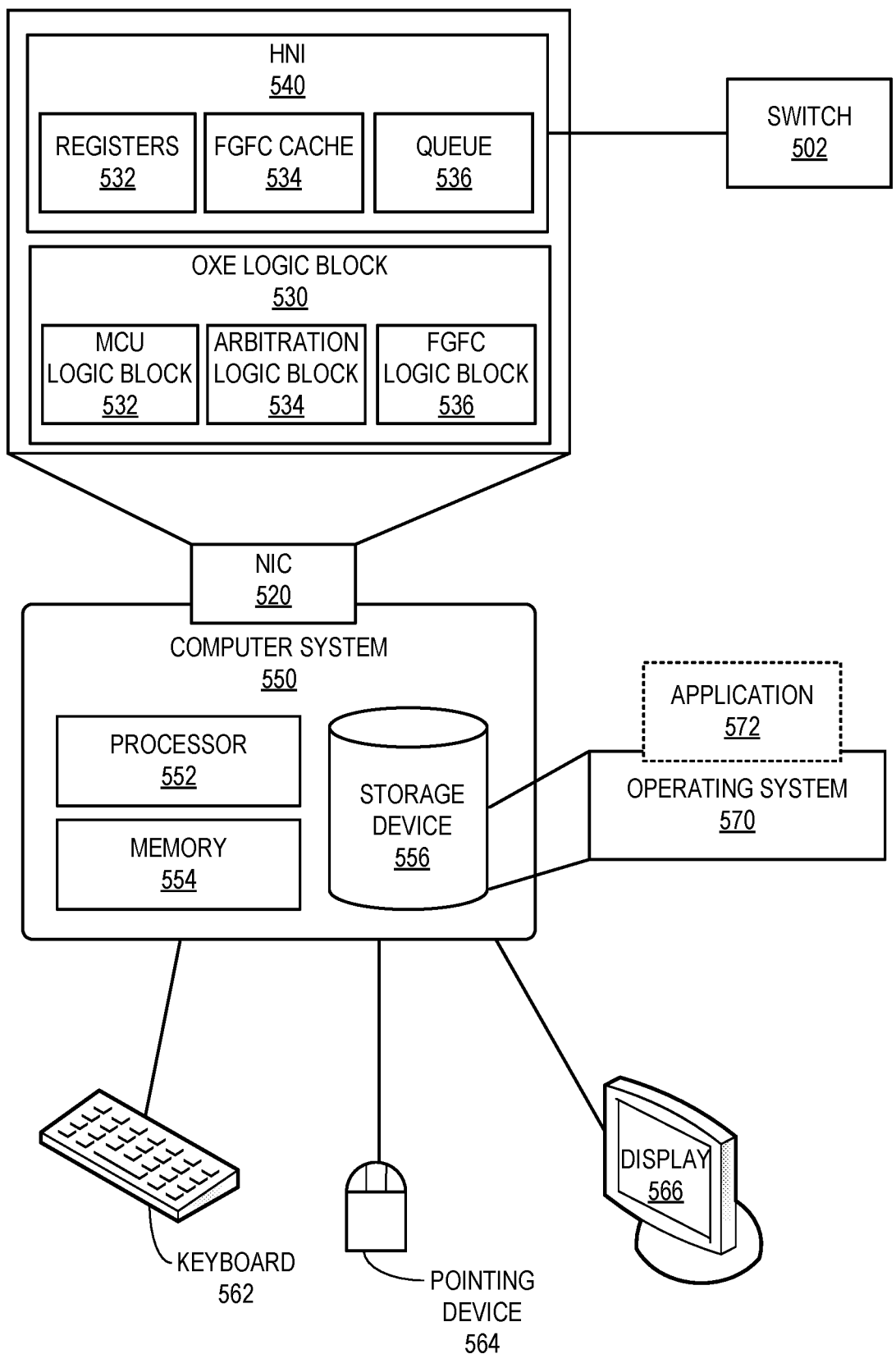
FIG. 5 shows an exemplary computer system equipped with a NIC with FGFC support.

FIG. 5 shows an exemplary computer system equipped with a NIC with FGFC support. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs, such as HNI 540, to computer system 550. NIC 520 can be coupled to a switch 502 via HNI 540. Upon receiving an FGFC control frame from switch 502, HNI 540 can determine whether the frame is an Ethernet-based frame or an API-based frame. If the frame is an Ethernet-based frame, HNI 540 can compare the source IP addresses with the local addresses stored in registers 532. Upon detecting a match, HNI 540 can process the frame based on the entries in FGLC cache 534 and the content of the frame. HNI 540 can also include a queue 536 that can store events that cannot be accommodated in an event engine of NIC 520. If the frame is an API-based frame, HNI 540 can provide header information to an OXE logic block 530 of NIC 520 and send the frame to OXE logic block 530.

OXE logic block 530 can store the information in an entry in an FGLC table 536. OXE logic block 530 can then process the frame based on the entries in FGLC table 536 and the content of the frame. Upon receiving a packet belonging to a flow subject to FGLC from computer system 550 via an HI of NIC 520, OXE logic block 530 can allocate the packet to an MCU logic block 532. An arbitration logic block 534 can select MCU logic block 532 based on an arbitration policy. If MCU logic block 532 is selected, OXE logic block 530 can process the packet based on a matching entry in FGLC table 536 and the content of the packet.

In summary, the present disclosure describes a NIC that facilitates fine-grain flow control (FGFC). The NIC can be equipped with a network interface, an FGFC logic block, and a traffic management logic block. During operation, the network interface can determine that a control frame from a remote switch is for applying FGFC. The network interface can then identify a data flow indicated in the control frame for applying the FGFC. The FGFC logic block can insert information from the control frame into an entry of a data structure stored in the NIC. The traffic management logic block can identify the entry in the data structure based on one or more fields of a packet belonging to the flow. Subsequently, the traffic management logic block can determine whether the packet is allowed to be forwarded based on the information in the entry.

The methods and processes described above can be performed by hardware logic blocks, modules, logic blocks, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computing system, comprising:
a processing resource; and
a network interface controller (NIC) to:
receive a control frame indicating initiation of a flow control operation for a data flow;
insert information from the control frame into an entry of a data structure stored in the NIC;
match a packet with the data flow based on an address of the packet;
identify the entry in the data structure based on one or more fields of the packet; and
determine whether the packet is allowed to be forwarded based on the flow control operation according to the information in the entry.

2. The computing system of claim 1, wherein the NIC is further to forward packets of a second data flow belonging to a same traffic class of the data flow.

3. The computing system of claim 1, wherein the NIC is further to: determine a pause period in the information in the control frame; and store the pause period in the entry.

4. The computing system of claim 3, wherein the NIC is further to: receive a second control frame indicating a second pause period associated with the flow control operation; and update the entry based on the second pause period.

5. The computing system of claim 3, wherein the NIC is further to terminate the flow control operation for the data flow based on the pause period and a credit value in the information of the control frame.

6. The computing system of claim 3, wherein the NIC is further to invalidate the entry and terminate the flow control operation for the data flow in response to: receiving a third control frame indicating a termination of the flow control operation; or expiration of the pause period.

7. The computing system of claim 1, wherein, to apply the flow control operation on the packet, the NIC is further to:
receive a flow credit from an upstream network device; and
send the packet to the upstream network device based on the flow control operation.

8. The computing system of claim 1, wherein, to insert the information into the entry, the NIC is to: determine the information match an existing entry in the data structure; and in response to not finding a match, insert the information into a new entry in the data structure.

9. The computing system of claim 8, wherein the NIC is to:
determine whether the data structure has availability for the new entry; and
in response to the data structure not having availability, discard the control frame without initiating the flow control operation for the data flow.

10. A method, comprising:
receiving, by a network interface controller (NIC) of a computing system, a control frame from a second computing system;
determining, from the control frame, information indicating initiation of a flow control operation for a data flow;
inserting information from the control frame into an entry of a data structure stored in the NIC;
matching a packet with the data flow based on an address of the packet;
identifying the entry in the data structure based on one or more fields of the packet; and
determining whether the packet is allowed to be forwarded based on the flow control operation according to the information in the entry.

11. The method of claim 10, further comprising forwarding packets of a second data flow belonging to a same traffic class of the data flow.

12. The method of claim 10, further comprising: determining a pause period in the information in the control frame; and storing the pause period in the entry.

13. The method of claim 12, further comprising:
receiving a second control frame indicating a second pause period associated with the flow control operation; and updating the entry based on the second pause period.

14. The method of claim 12, further comprising terminating the flow control operation for the data flow based on the pause period and a credit value in the information of the control frame.

15. The method of claim 12, further comprising invalidating the entry and terminating the flow control operation for the data flow in response to:

receiving a third control frame indicating a termination of the flow control operation; or expiration of the pause period.

16. The method of claim 10, wherein applying the flow control operation on the packet further comprises: receiving a flow credit from the second computing system; and sending the packet to the second computing system based on the flow control operation.

17. The method of claim 10, wherein inserting the information into the entry further comprises: determining the information match an existing entry in the data structure; and in response to not finding a match, inserting the information into a new entry in the data structure.

18. The method of claim 10, further comprising:
determining whether the data structure has availability for the new entry; and
in response to the data structure not having availability, discarding the control frame without initiating the flow control operation for the data flow.

19. A non-transitory computer-readable storage medium storing instructions that when executed by a computer cause the computer to:

receive a control frame at a network interface controller (NIC) of the computer;
obtain, from control frame, information indicating initiation of a flow control operation for a data flow;
identify, in the NIC, a data structure associated with the flow control operation of the NIC;
insert information from the control frame into an entry of the data structure;
match a packet with the data flow based on an address of the packet;
identify the entry in the data structure based on one or more fields of the packet; and
determine whether the packet is allowed to be forwarded based on the flow control operation according to the information in the entry.

20. The non-transitory computer-readable storage medium of claim 19, wherein the flow control operation is terminated for the data flow in response to:
receiving a second control frame indicating a termination of the flow control operation; and expiration of a pause period indicated in the control frame.

* * * * *